United States Patent [19]

Takagi et al.

[11] 4,180,975
[45] Jan. 1, 1980

[54] SECONDARY AIR SUPPLY SYSTEM USING REED VALVES

[75] Inventors: Yasuo Takagi; Kazumasa Katoh, both of Yokohama, Japan

[73] Assignee: Nissan Motor Company, Limited, Yokohama, Japan

[21] Appl. No.: 863,693

[22] Filed: Dec. 23, 1977

[30] Foreign Application Priority Data

Dec. 27, 1976 [JP] Japan .................. 51-158268

[51] Int. Cl.² ............................................. F01N 3/10
[52] U.S. Cl. ...................................... 60/290; 60/293
[58] Field of Search ...................... 60/290, 293, 289

[56] References Cited

U.S. PATENT DOCUMENTS 4,085,586  4/1978  Shibata ..................... 60/293

*Primary Examiner*—Douglas Hart

[57] ABSTRACT

The secondary air supply system of an internal combustion engine is provided with two reed valves through which atmospheric air is induced to the exhaust system of the engine. The two reed valves are selectively maintained operable under low and high engine speed operating conditions, respectively.

8 Claims, 2 Drawing Figures

SECONDARY AIR SUPPLY SYSTEM USING REED VALVES

BACKGROUND OF THE INVENTION

This invention relates to a system for supplying supplemental air into the exhaust system of an internal combustion engine, and more particularly to an improvement in the system of the type wherein the supplemental air is induced into the exhaust system by the action of exhaust pressure pulsation generated in the exhaust system.

In connection with internal combustion engines provided with an exhaust system of the type wherein unburned constituents in the exhaust gases are burned to discharge clean exhaust gases into the atmosphere, it is known that supplemental air is supplied to the exhaust system to support burning of the unburned constituents in the exhaust gases. This supplemental air is, in general, called "secondary air" hereinafter. It is also known in the art, that atmospheric air as the secondary air is intermittently induced into the exhaust system by using a reed-type check valve which is operated by the action of exhaust pressure pulsation generated in the exhaust system.

However, this reed valve has encountered the difficulty in which a sufficient amount of secondary air can not be supplied to the exhaust system under high engine speed operation condition. This results from the relationship of the characteristic-frequency of the reed valve and the frequency of the exhaust pressure pulsation during the high engine speed operation. As the frequency of the exhaust pressure pulsation closes to the characteristic-frequency or its resonance frequency of the reed valve, the phase difference between the opening operation of the reed valve and the exhaust pressure pulsation vacuum is increased thereby to decrease the amount of secondary air induced into the exhaust system. With this effect, the counter-flow of a portion of the exhaust gases arises toward the reed valve to discharge the gases into the atmosphere, which leads to thermal damage of the reed valve due to exhaust gas heat.

In order to prevent this counter-flow of the exhaust gases, it is considered to set the characteristic-frequency of the reed valve outside of an exhaust pressure pulsation frequency range which is encountered under normal engine speed operating condition, by increasing the spring constant of the reed member of the reed valve so as to increase the characteristic-frequency of the reed valve. However, as the spring constant of the reed member thus increases, deflection amount of the reed member during opening operation is decreased thereby causing shortage of the secondary air amount induced to the exhaust system under low engine speed operating condition.

SUMMARY OF THE INVENTION

It is the principal object of the present invention to provide an improved secondary air supply system for an internal combustion engine, in which a sufficient amount of secondary air is supplied to the exhaust system of the engine to effectively burn the unburned constituents in the exhaust gases under all engine operating conditions where secondary air is necessary.

Another object of the present invention is to provide an improved secondary air supply system of the type wherein atmospheric air is induced into the exhaust system of the engine by the action of exhaust pressure pulsation generated in the exhaust system, in which a sufficient amount of atmospheric air can be effectively induced into the exhaust system throughout all engine operating conditions where secondary air is necessary.

A further object of the present invention is to provide an improved secondary air supply system using reed valves, in which the characteristic-frequencies of the reed valves are set to prevent their resonance phenomenon due to the exhaust pressure pulsations under normal engine operating condition.

A still further object of the present invention is to provide an improved secondary air supply system using a plurality of reed valves which are arranged to be selectively operated in response to varying engine operating conditions, by which is sufficient amount of secondary air is supplied to the exhaust system throughout all engine operating ranges where secondary air is necessary.

Other objects, advantages, and features of the secondary air supply system according to the present invention will be more apparent from the following description taken in conjunction with the accompanying drawings.

DESCRIPTION OF THE PREFERRED EMBODIMENT

Figure 1:
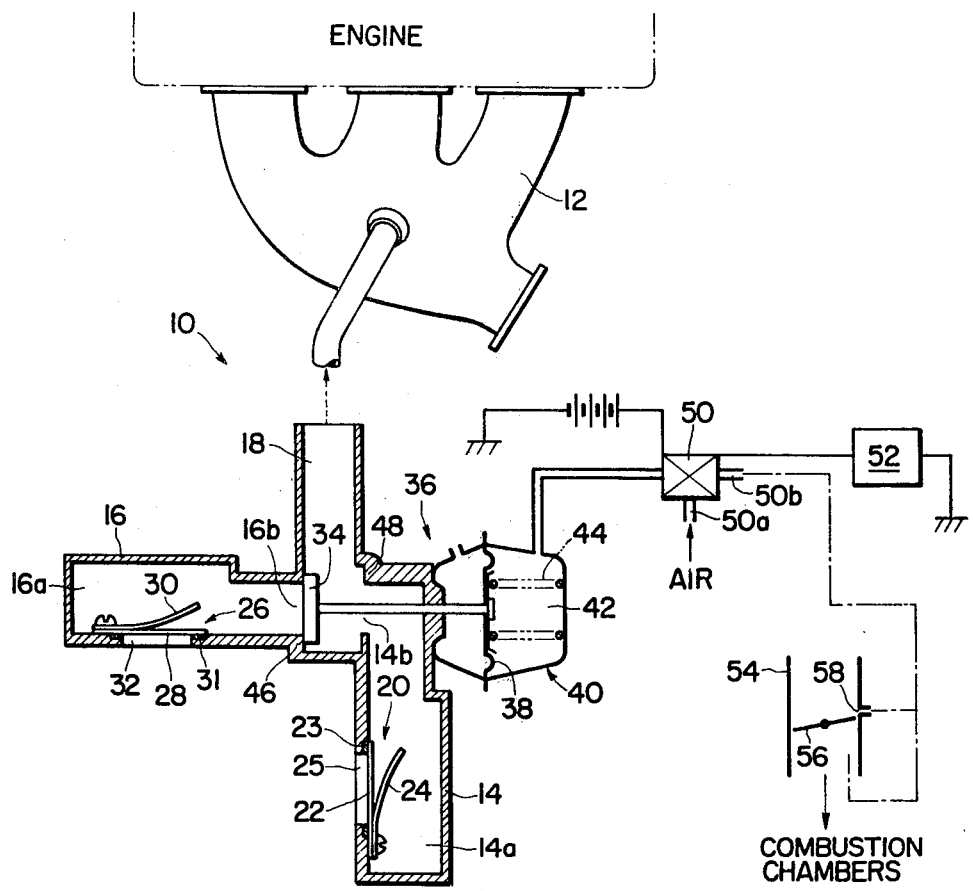
FIG. 1 is a schematic illustration of a preferred embodiment of a secondary air supply system in accordance with the present invention.

Referring to FIG. 1 of the drawing, a preferred embodiment of a secondary air supply system 10 according to the present invention is shown in combination with an exhaust manifold 12 forming part of the exhaust system of an internal combustion engine of a motor vehicle (not shown). The secondary air supply system 10 is composed of first and second inlet pipes 14 and 16 which are closed at their one ends to define therein first and second chambers 14a and 16a, respectively. The first and second chambers 14a and 16a are communicable with the exhaust manifold 12 through a conduit 18 connected to the exhaust manifold.

A first reed valve 20 or a reed-type check valve is operatively mounted on the wall of the first inlet pipe 14 and arranged to open as the exhaust manifold pressure drops below atmospheric pressure to permit air flow into the exhaust manifold through the first chamber 14a and the conduit 18. The first reed valve 20 consists of a reed member 22 or a flexible valve leaf which is secured at its one end with a nut (no numeral) to the wall of the first inlet pipe 14. The reed member 22 is seatable on a valve seat 23 which is securely mounted around an opening 25 formed through the first inlet pipe wall. The reference numeral 24 indicates a stop member for limiting the movement of reed member 22. Accordingly, the reed member 22 is arranged to flap to open or close the opening 25 by the pressure differential between the first chamber 14a and the atmosphere. A second reed valve 26 is constructed and arranged similar to the first reed valve 20 and, as such, the reed member 28 is secured at its one end to be seatable on a valve seat 31 securely disposed around an opening 32 formed through the second inlet pipe wall. A stop member 30 is used to similarly function to the stop member 24. In this case, the reed members 22 and 28 are made of stainless steel sheets of 0.20 mm and of 0.25 mm, respectively, and each stainless steel is coated with a film of Teflon which is a trade name of polytetrafluoroethylene.

It is to be noted that the first reed valve 20 is so constructed and arranged that the characteristic-frequency of the first reed member 22 is lower than that of the second reed member 28 of the second reed valve 26, and in other words, the first reed member 22 has a spring constant lower than that of the second reed member 28. However, the characteristic-frequency of the first reed member 22 should be in a range where the first reed member 22 does not bring about its resonance during low engine speed operation. In this case, the first reed valve 20 is used to induce the atmospheric air into the exhaust manifold 12 at a relatively low engine speed operating range, whereas the second reed valve 26 is used at a relatively high engine speed operating range. In case of a 4-cycle, 4-cylinder type engine, the characteristic-frequencies of the first and second reed members 22, 28 are determined to 150 Hz and 200 Hz, respectively.

The reference numeral 34 represents a valve head forming part of a vacuum operated valve assembly 36. The valve head 34 is securely connected through a rod (no numeral) to a diaphragm member 38 which is secured inside of a casing (no numeral) of a diaphragm device 40 and defining a vacuum operating chamber 42. A spring 44 is disposed in the chamber 42 to urge the diaphragm member 38 in a direction to put the valve head 34 at its first position where the valve head 34 urgingly contacts a valve seat section 46 formed around an open end portion 16b of the second inlet pipe 16 so as to close the open end portion 16b, when the vacuum operating chamber 42 is supplied with atmospheric air. Conversely, when the vacuum operating chamber 42 is supplied with a vacuum to pull the diaphragm member 38 in the right in the drawing against the bias action of the spring 44, the valve head 34 is put at its second position where the valve head 34 urgingly contacts a valve seat section 48 surrounding an opening 14b formed with the first inlet pipe 14 to close the opening 14b.

The vacuum operating chamber 42 is communicated through a passage (no numeral) with a three-way solenoid valve 50. The solenoid valve 50 is constructed and arranged to take a first position to provide communication, through an air inlet 50a, between the vacuum operating chamber 42 and the atmosphere upon receiving a first electric signal from an engine speed sensor 52, and to take a second position to provide communication, through an vacuum inlet 50b, between the chamber 42 and a vacuum source such as an intake passageway 54 upon receiving a second electric signal from the engine speed sensor 52. Through the intake passageway 54, intake air is induced into the combustion chambers of the engine. The vacuum inlet 50b is communicated with the intake passageway 54 downstream of a throttle valve 56 of an engine carburetor (not shown). The vacuum inlet 50b may be communicated with the intake passageway 54 through a hole 58 which is located just upstream of the uppermost peripheral edge of the throttle valve 56 at its fully closed position, the location of the hole 58 changing to a downstream side of the throttle valve as the throttle valve opens, as seen from the drawing.

The engine speed sensor 52 is electrically connected to the three-way solenoid valve 50 and arranged to produce the first electric signal when the engine speed is lower than a predetermined level such as 1800 rpm, whereas to produce the second electric signal when the engine speed is higher than the predetermined level. In this connection, the characteristic-frequency of the first reed member 22 is so set that resonance of the first reed member 22 never occurs before engine speed does not reach the predetermined level, whereas the characteristic-frequency of the second reed member 28 is so set that resonance of the second reed member 28 never occurs at normal engine operating range which, for example, lies within an engine speed range up to about 4000 or 4500 rpm and a vehicle cruising speed range up to about 150 Km/h.

In operation, under a relatively low engine speed operating conditions, the engine speed sensor 52 produces the first electric signal and transmits it to the three-way solenoid valve 50. Then, the solenoid valve 50 takes the first position and is operated to supply atmospheric air into the vacuum operating chamber 42 of the vacuum operated valve assembly 36. Accordingly, the valve head 34 is urged to the valve seat section 46 of the second inlet pipe 16 to close the opening 16b, providing only communication between the first chamber 14a of the first inlet pipe 14 and the exhaust manifold 12 through the conduit 18. As a result, atmospheric air or secondary air is induced through the first reed valve 20 into the exhaust manifold 12.

Under a relatively high engine speed operating condition, the engine speed sensor 52 produces the second electric signal and transmit it to the three-way solenoid valve 50 and consequently the solenoid valve takes the second position and operates to supply the vacuum operating chamber 42 with the intake vacuum in the intake passageway 54. Then, the valve head 34 is moved to contact the valve seat section 48 of the first inlet pipe 14 so as to close the opening 14b of the first inlet pipe 14, providing only communication between the second chamber 16a and the exhaust manifold 12. As a result, atmospheric air is induced through the second reed valve 26 into the exhaust manifold 12.

It will be appreciated from the foregoing discussion, that the second reed valve 26 shown in FIG. 1 is arranged to prevent its resonance phenomenon due to exhaust pressure pulsation during high engine speed operation and therefore a sufficient amount of atmospheric air or the secondary air is supplied to the exhaust system even under high engine speed operating condition.

Figure 2:
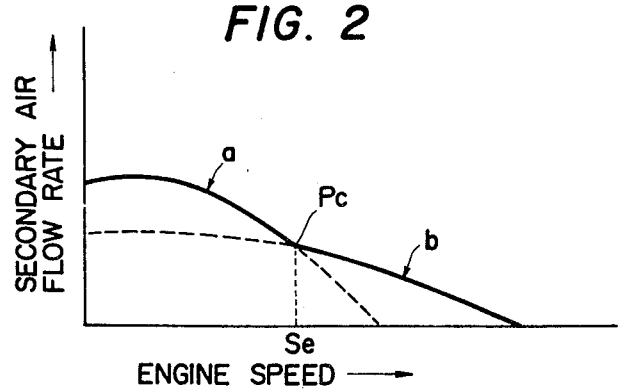
FIG. 2 is a graph showing the characteristics of the variation of secondary air amount supplied to an exhaust system with the secondary air supply system of FIG. 1.

FIG. 2 shows the characteristics of the rate of secondary air flow to the exhaust system by the first and second reed valves 20 and 26 shown in FIG. 1. By the secondary air flow rate, secondary air flow amount/intake air amount is meant. In FIG. 2, a curve a indicates the characteristic by first reed valve 20 operative at low engine speed operation and a curve b indicates that by the second reed valve 26 operative at high engine speed operation. As seen from FIG. 2, sufficient amounts of atmospheric air or secondary air are induced into the exhaust system throughout all engine operating conditions where secondary air is required.

It is preferable to obtain smooth and stable induction of secondary air, that changing the operations of the first and second reed valves 20 and 26 is carried out at an engine speed $S_e$ corresponding to the crossing point $P_c$ where the curves a and b crosses as shown in FIG. 2. Furthermore, it is also preferable to put both the first and second reed valves 20 and 26 into operative conditions during low engine speed operation, while put only the second reed valve into operative condition during high engine speed operation. Because, if also the first reed valve 20 is in operative condition during the high engine speed operation, the counter-flow of the exhaust gases may occur through the first reed valve 20.

While only two reed valves have been shown and described to be used hereinbefore, it will be understood that more than two reed valves may be used to be operative, respectively, under engine operating conditions which are subdivided into the number of reed valves thereby to improve efficiency of secondary air supply to the exhaust system. Although the operations of the reed valves in the embodiment of FIG. 1 has been carried out in response to the signal representing engine speeds, it may be carried out in response to a signal representing vehicle speed, venturi vacuum generated at the venturi portion of the engine carburetor, intake vacuum in the intake passageway, or hydraulic pressure in a hydraulic system of a motor vehicle.

It will be appreciated that, by the present invention, the two reed valves 20 and 26 are arranged to selectively put into operative condition thereby to prevent the counter-flow of exhaust gases which is liable to occur through the reed valve 22 having lower characteristic-frequency. Furthermore, supply of an excess amount of the secondary air is prevented under low engine speed operation condition, thereby preventing degradation of oxidation efficiency of carbon monoxide and hydrocarbons due to the cooling effect with the excess amount of the supplied secondary air.

What is claimed is:

1. In a system for supplying air into the exhaust system of an internal combustion engine by the action of exhaust pressure pulsation, the improvement comprising:

a plurality of reed valves through which the exhaust system is communicable with the atmosphere to induce atmospheric air into the exhaust system when each reed valve is operated to open upon receiving an exhaust pressure below the atmospheric pressure, the reed members of said plurality of reed valves being different in their characteristic-frequencies from each other;

selecting means for selectively put one of said reed valves at an operable condition in response to an engine operating condition.

2. In a system for supplying secondary air into the exhaust system of an internal combustion engine by the action of exhaust pressure pulsation generated in the exhaust system, the improvement comprising:

first and second reed valves through which the exhaust system is communicable with the atmosphere to induce atmospheric air into the exhaust system when each reed valve is operated to open upon receiving a pressure below the atmospheric pressure, the reed member of said first reed valve having a characteristic-frequency lower than that of the reed member of said second reed valve, the characteristic-frequency of the reed member of said second reed valve being so set that resonance of the reed member occurs outside of a predetermined engine operating range;

selecting means for selectively put either one of said first and second reed valves at an operable condition in response to an engine operating parameter representing engine speed variation.

3. The improvement as claimed in claim 2, further comprising first and second inlet pipes on which said first and second reed valves are operatively mounted, respectively, said first and second inlet pipes defining therein first and second chambers, respectively, which are communicable with the exhaust system.

4. The improvement as claimed in claim 3, in which said selecting means includes valve means for taking first and second positions to communicate the exhaust system with said first and second chambers, respectively, and operating means for causing said valve means to take the first position when said engine operating parameter represents an engine speed lower than a predetermined level and to take second position when said engine operating parameter represents an engine speed higher than the predetermined level.

5. The improvement as claimed in claim 4, further comprising a conduit which is capable of communicating an exhaust manifold forming part of the exhaust system with said first and second chambers through said valve means.

6. The improvement as claimed in claim 5, in which said valve means includes a vacuum operated valve having a diaphragm member defining a vacuum operating chamber, a valve head connected to said diaphragm member and arranged to close the second chamber to block communication between the exhaust manifold and the second chamber when the vacuum operating chamber is supplied with atmospheric air, and to close the first chamber to block communication between the exhaust manifold and the first chamber when the vacuum operating chamber is supplied with a vacuum; and said operating means includes an engine speed sensor for producing a first signal when the engine speed is lower than the predetermined level and a second signal when the engine speed is higher than the predetermined level, and a three-way solenoid valve operatively connected to said engine speed sensor and arranged to take a first position to provide communication between the vacuum operating chamber of said vacuum operated valve and the atmosphere upon receiving the first signal from said engine speed sensor, and take a second position to provide communication between the vacuum operating chamber and a vacuum source upon receiving the second signal from said engine speed sensor.

7. The improvement as claimed in claim 6, in which said vacuum source is an intake passage through which intake air is supplied to the combustion chambers of engine.

8. The improvement as claimed in claim 2, in which the first reed member has a spring constant lower than that of the second reed member.

* * * * *